United States Patent [19]
Shirai et al.

[11] Patent Number: 5,520,867
[45] Date of Patent: May 28, 1996

[54] METHOD OF MANUFATURING A RESIN STRUCTURE REINFORCED WITH LONG FIBERS

[75] Inventors: Yoshimitsu Shirai, Shizuoka; Haruji Murakami; Takeshi Amaike, both of Fuji, all of Japan

[73] Assignee: Polyplastics Co., Ltd., Japan

[21] Appl. No.: 377,107

[22] Filed: Jan. 23, 1995

[30] Foreign Application Priority Data

Jan. 26, 1994 [JP] Japan .................. 6-023809

[51] Int. Cl.⁶ .................. B29B 9/06; B29C 47/02
[52] U.S. Cl. .............. 264/140; 264/171.13; 264/171.23; 264/171.24
[58] Field of Search .................. 264/174, 140, 264/171.13, 171.23, 171.24

[56] References Cited

U.S. PATENT DOCUMENTS 3,993,726  11/1976  Moyer ..................... 264/174
4,614,678  9/1986  Ganga .................. 264/174 X

FOREIGN PATENT DOCUMENTS 57-181852  11/1982  Japan .

Primary Examiner—Leo B. Tentoni
Attorney, Agent, or Firm—Nixon & Vanderhye

[57] ABSTRACT

A method of manufacturing a resin structure reinforced with long fibers in which a continuous fiber bundle is loosened in a fiber-loosening step and the loosened continuous fiber bundle is impregnated with a resin melt in an impregnation step. The fiber-loosening index S of the loosened continuous fiber bundle represented by equation (I) is within the range of 2.0 to 18.0:

$$S = 5 \times 10^{-2} \cdot T/L \cdot 1/D \qquad (I)$$

in which T is the Tex number of the continuous fiber bundle, D is a diameter (micrometer) of the continuous fibers contained in the fiber bundle, and L is a width (cm) of the continuous fiber bundle. Mechanical properties of the resin structure of the invention and the appearance of the final products are improved. Moreover, further improvements are obtained with respect to the prevention of dropping-off of fiber filaments from the product, smooth operation in the impregnation step, and the production efficiency.

6 Claims, 1 Drawing Sheet

METHOD OF MANUFATURING A RESIN STRUCTURE REINFORCED WITH LONG FIBERS

BACKGROUND OF THE INVENTION

1. Field of the Invention

The present invention relates to a method of manufacturing a resin structure reinforced with long fibers. More particularly, the invention relates to a method of manufacturing a resin structure reinforced with long fibers in which impregnation of the fibers with a resin melt is improved by specifying the degree of fiber loosening of a continuous fiber bundle.

2. Description of the Related Art

Elongated resin structures reinforced with fibers in which thermoplastic resins are reinforced with continuous fibers have mechanical properties much superior to those of the structures reinforced with short fibers. Such structures are beneficial because they can be cut and formed Into pellets or similar materials. Due to these advantageous features, they have recently become of particular interest. Elongated thermoplastic resin structures reinforced with fibers are generally manufactured by the so-called pultrusion method by impregnating a thermoplastic resin into a continuous fiber bundle for reinforcement while the bundle is passed through a cross-head extrusion die, after which the resin-impregnated fiber bundle is drawn out though the die (U.S. Pat. No. 3,993,726), or by drawing a continuous fiber bundle for reinforcement through a melt thermoplastic resin to wet the bundle and pulling out the wet bundle through a die (Japanese Patent Application Laid-open (kokai) No. 57-181,852). After undergoing the pultrusion method, the structures are cut to a desired size.

Other types of structures which are obtained by reinforcing thermosetting resins with continuous fibers are manufactured by various methods. For example, in the so-called filament winding method, fibers such as glass roving are coated with a resin before the resin has set and wound around a rotating frame while applying tension, and then the resin is allowed to set. In the preforming method, a semi-set prepreg is formed. In the pultrusion method, profile extrusion is first performed, after which the extruded product is completely set.

In the manufacture of these resin structures reinforced with long fibers, irrespective of whether a thermoplastic resin or a thermosetting resin is used, it is important that a matrix resin be uniformly impregnated into continuous fiber bundles for reinforcement in order to achieve consistent manufacture and to obtain good mechanical properties of the resulting resin structures reinforced with long fibers as well as a good appearance and to prevent fiber filaments from falling off the products.

To this end, it is a general practice that a fiber bundle which has been bound is loosened while passing through tension bars or rolls under tension, and the loosened fiber bundle is impregnated with a molten or liquid-state resin. However, uniform impregnation is difficult to achieve by this method because impregnation is affected by the diameter or the Tex number of the continuous fibers which are used, although the degree of fiber loosening of a continuous fiber bundle is presumed to have some relation to uniform impregnation.

In view of the foregoing, the inventors of the present invention conducted extensive studies of the most suitable degree of loosening of a fiber bundle when a loosened continuous fiber bundle is impregnated with a resin melt, and found it important that the fiber-loosening index be in a specific range, leading to completion of the invention.

SUMMARY OF THE INVENTION

Accordingly, an object of the present invention is to provide a method of manufacturing a resin structure reinforced with long fibers which comprises the steps of:

loosening a continuous fiber bundle, and impregnating the resulting loosened continuous fiber bundle with a melt resin, wherein the fiber-loosening index S of the loosened continuous fiber bundle represented by the following equation (I) is within the range of 2.0 to 18.0:

$$S = 5 \times 10^{-2} \cdot T/L \cdot 1/D \tag{I}$$

wherein T is the Tex number of the continuous fiber bundle, D is a diameter (micrometer) of the continuous fibers contained in the fiber bundle, and L is a width (cm) of the continuous fiber bundle.

In a preferred embodiment, loosening of the fiber bundle is carried out by static electricity or blown air (an air Jet), the loosened continuous fiber bundle is substantially not twisted, and the impregnation with the resin melt is carried out by the use of a cross-head die.

Preferably, a plurality of continuous fiber bundles are aligned, with each bundle being loosened by a loosening means and impregnated with a molten thermoplastic resin, and the impregnated fiber bundles are each continuously taken up while squeezing out excess resin by a squeezing means.

The above and other objects, features and advantages of the present invention will become apparent from the following description.

DESCRIPTION OF PREFERRED EMBODIMENTS

Figure 1:
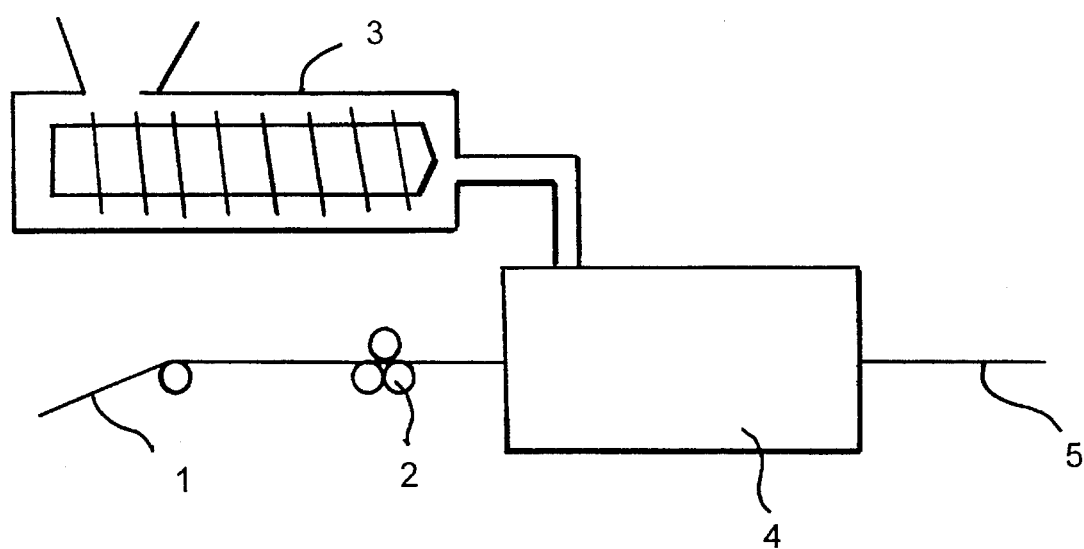
FIG. 1 is a schematic illustration showing an example of a method of manufacturing a resin structure reinforced with long fibers according to the present invention.

The present invention will now be described with reference to an example schematically shown in FIG. 1. In FIG. 1, reference numeral 1 indicates a fiber bundle taken off a roving. The fiber bundle preferably has no twist. The fiber bundle may be a single bundle, but preferably, a plurality of bundles are aligned and are simultaneously loosened. Numeral 2 indicates a roll bar, numeral 3 indicates an extruder for supplying a thermoplastic resin melt, numeral 4 indicates a cross-head die for impregnating the thermoplastic resin melt into fiber bundle 1, and numeral 5 is a fiber bundle which has been impregnated with a thermoplastic resin.

There is no limitation to the kind of fiber in the fiber bundle which is used in the present invention. For example, fibers with a high melting point such as glass fibers, carbon fibers, metallic fibers, aromatic polyamide fibers, and the like can be used. These fibers are generally, but not necessarily, used after being treated with a known surface-treating agent (binder). Of these fibers, glass fibers are preferable in view of the strength and the price of the resulting resin structures reinforced with lone fibers.

The Tex number of the continuous fiber bundle which is used in the present invention is from 4,400 to 120, and preferably from 2,200 to 740.

Fiber bundle 1 is loosened in a fiber-loosening step using roll bars 2. Although a roll bar is used in FIG. 1, other fiber loosening means such as static electricity, blown air (an air jet), water jet, tension bar, or needle punch may also be used.

In the present invention, the fiber-loosening index S given by the following equation (I) with respect to a loosened continuous fiber bundle falls within the range from 2.0 to 18.0, preferably from 2.3 to 11.0. In the equation, T is the Tex number of the continuous fiber bundle, D is the diameter (micrometer) of the continuous fibers, and L is the width (cm) of the continuous fiber bundle.

$$S = 5 \times 10^{-2} \cdot T/L \cdot 1/D \qquad (I)$$

If the fiber loosening index S of the loosened continuous fiber bundle exceeds the upper limit 18.0, impregnation of a resin melt into the continuous fiber bundle becomes poor. On the other hand, if the index S is lower than the lower limit 2.0, uneven tension is applied to each fiber in the widthwise direction of the loosened continuous fiber bundle, resulting in easy breakage of the fibers, which worsens the operability of the impregnation step and the production efficiency. The fiber-loosening index S can be readily adjusted to fall in the above described range by controlling, that is, tightening or loosening, the fiber loosening conditions of the fiber loosening means such as roll bars.

The impregnation method which is used in the present invention is not particularly limited. For example, known methods may be adopted, such as a method in which an impregnation die such as a cross-head die is used, or a method in which an impregnating tank is used. Particularly, a method using an impregnation die such as a cross-head die is preferably employed.

In the present invention, thermoplastic resins and thermosetting resins are both useful as the resins for impregnating a fiber bundle. Examples of the thermoplastic resins include polyolefins such as polyethylene and polypropylene, polyesters such as polyethylene terephthalate and polybutylene terephthalate, polyamides such as nylon 6, nylon 66, nylon 11, nylon 12, nylon 610 and nylon 612, other thermoplastic resins such as polyacetals, polycarbonates, thermoplastic polyurethanes, polyphenylene sulfides, polyphenylene oxides, polysulfones, polyetherketones, polyetheramides and polyetherimides, and combinations of these. Examples of the thermosetting resins include unsaturated polyesters, epoxy resins, thermosetting polyurethanes, and prepolymers of these. In view of the ease of processing of the resulting resin structures reinforced with long fibers, use of thermoplastic resins for impregnating fiber bundles is preferred.

The continuous fiber bundle which has been impregnated with a thermoplastic resin melt when it passes through a cross-head die 4 is drawn by drawing equipment (not shown), and excess thermoplastic resin is squeezed out when the bundle passes a squeezing means which is usually a shaping die (not shown), by which the fiber bundle is formed into a desired shape such as a strand, a bar, a ribbon, a tape, a sheet, a plate, or another special shape. Subsequently, the shaped fiber bundle is taken up by a take-off roll. The resin structure reinforced with long fibers which is thus obtained is used as is or is cut into an arbitrary length and used as pellets, etc. for being molded or supplied to another processing step.

There is no particular limitation with respect to the composition (amount of the fibers, etc.) of the thus obtained resin structure reinforced with long fibers. In view of the physical properties of the obtained structure, the fiber may be from 20 to 80% by weight of the total weight of the structure. The range from 80 to 70% by weight is particularly preferred.

The resin structure reinforced with long fibers according to the present invention may optionally contain a variety of additives which are routinely added to resins as desired. Examples of such optional additives include antioxidants, UV absorbers, antistatics, lubricants, plasticizers, mold release agents, flame retardants, flame-retarding additives, colorants, inorganic fillers, and organic fillers.

EXAMPLES

The present invention will further be described in detail by way of examples, which should not be construed as limiting the invention.

Example 1:

Ten bundles of glass fibers of 2,200 Tex (diameter of fiber D:13 micrometer) were taken off from 10 cylindrical packages (hollow cylindrical shape). They were aligned in the same horizontal plane and processed with the apparatus shown in FIG. 1. Each fiber bundles was first loosened using roll bars so that the fiber-loosening index S became 2.3 by controlling the tension of the roll bars. Subsequently, the fiber bundles were impregnated with a polypropylene melt using a cross-head die. The Impregnated fiber bundles were passed through a shaping die and a pelletizer to obtain a pelletized resin structure reinforced with long fibers (pellet length: 10 mm). The obtained pellets were processed with an injection molding machine to prepare a test piece for measuring mechanical properties. Tensile strength (TS), flexural stiffness (FS), and Izod impact (IZ) were measured.

In a similar manner, a test piece for evaluating glass fiber distribution (300 mm×200 mm×2 mm) was formed, and the number of glass fibers (or glass fiber bundles) which were visually recognized through the surface and which had a length longer than 1.0 mm was counted. The results are shown in Table 1.

Example 2:

The procedure of Example 1 was repeated except that the tension of the roll bars was changed so that the fiber-loosening index S of the loosened continuous fiber bundle became 8.0. The physical properties of the resulting pelletized resin structure reinforced with long fibers are shown in Table 1.

Comparative Example 1:

The procedure of Example 1 was repeated except that the tension of the roll bars was changed so that the fiber-loosening index S of the loosened continuous fiber bundle became 20. The physical properties of the resulting pelletized resin structure reinforced with long fibers are shown in Table 1.

TABLE 1

|  | Example 1 | Example 2 | Comparative Example 1 |
| --- | --- | --- | --- |
| Fiber loosening index S | 2.3 | 8.0 | 20 |
| Glass fiber distribution (No. of fibers) | 0 | 3.2 | 31.5 |
| TS (kg/cm$^2$) | 1480 | 1450 | 1170 |
| FS (kg/cm$^2$) | 1710 | 1690 | 1505 |

TABLE 1-continued

|  | Example 1 | Example 2 | Comparative Example 1 |
|---|---|---|---|
| IZ (kg) | 35.0 | 33.8 | 33.0 |

As described above, according to the present invention, a continuous fiber bundle is loosened so that the fiber loosening index S of the fiber bundle falls within a predetermined range, after which a resin melt is impregnated into the loosened fiber bundle. Therefore, mechanical properties of the obtained resin structure reinforced with long fibers and appearance of the product are improved. Moreover, further improvements are obtained with respect to the prevention of falling-off of fiber filaments from the product, smooth operation in the impregnation step, and the production efficiency. Thus, the present invention has a high industrial value.

What is claimed is:

1. A method of manufacturing a resin structure reinforced with long fibers which comprises the steps of:

(a) loosening a continuous fiber bundle, and (b) impregnating the resulting loosened continuous fiber bundle with a resin melt, and (c) forming a long fiber-reinforced resin structure from the impregnated continuous fiber bundle obtained according to step (b), wherein step (a) is practiced so as to loosen the continuous fiber bundle to achieve a fiber-loosening index S represented by the following equation (I) within the range of 2.0 to 18.0:

$$S = 5 \times 10^{-2} \cdot T/L \cdot 1/D \qquad (I)$$

in which T is the Tex number of the continuous fiber bundle, D is the diameter in micrometers of the continuous fibers contained in the fiber bundle, and L is the width in centimeters of the continuous fiber bundle.

2. The method according to claim 1, in which said loosened continuous fiber bundle has substantially no twist.

3. The method according to claim 1, in which said impregnation is carried out with a cross-head die.

4. The method according to claim 1, in which a plurality of the continuous fiber bundle are aligned and loosened by fiber loosening means, a resin melt is then impregnated in the loosened continuous fiber bundles, and the resulting resin-impregnated fiber bundles are continuously taken up while excess resin is squeezed out by squeezing means.

5. The method according to claim 1, wherein step (c) includes forming the impregnated continuous fiber bundle into a long fiber-reinforced structure having a shape selected from the group consisting of strands, bars, ribbons, tapes, sheets and plates.

6. The method according to claim 1, wherein step (c) includes forming pellets from the impregnated continuous fiber bundle, and then molding the pellets into the long fiber-reinforced structure.

* * * * *